United States Patent
Raksha et al.

(10) Patent No.: US 11,198,315 B2
(45) Date of Patent: Dec. 14, 2021

(54) ARTICLE WITH CURVED PATTERNS FORMED OF ALIGNED PIGMENT FLAKES

(71) Applicant: VIAVI SOLUTIONS INC., San Jose, CA (US)

(72) Inventors: Vladimir P. Raksha, Santa Rosa, CA (US); John Hynes, Monroe Township, NJ (US); Laurence Holden, Cranbury, NJ (US); Paul G. Coombs, Santa Rosa, CA (US)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 16/733,081

(22) Filed: Jan. 2, 2020

(65) Prior Publication Data

US 2020/0215845 A1 Jul. 9, 2020

Related U.S. Application Data

(62) Division of application No. 16/224,575, filed on Dec. 18, 2018, now Pat. No. 10,562,333, which is a
(Continued)

(51) Int. Cl.
*B42D 25/369* (2014.01)
*B44F 1/10* (2006.01)
(Continued)

(52) U.S. Cl.
CPC .......... *B42D 25/369* (2014.10); *B05D 3/207* (2013.01); *B05D 5/061* (2013.01); *B41M 3/14* (2013.01);
(Continued)

(58) Field of Classification Search
CPC . B41M 3/14; B05D 3/207; B05D 5/06; B42D 25/369; B42D 2035/20; H01F 41/16; C09C 1/0015; C09C 2210/00
See application file for complete search history.

(56) References Cited

U.S. PATENT DOCUMENTS

| 2,570,856 A | 10/1951 | Pratt et al. .................. 41/32 |
| 3,011,383 A | 12/1961 | Sylvester et al. ............. 359/584 |

(Continued)

FOREIGN PATENT DOCUMENTS

| AU | 488652 | 11/1977 | ................ B44F 1/12 |
| DE | 1696245 | 1/1972 | ................ D21H 5/10 |

(Continued)

OTHER PUBLICATIONS

The Mearl Corporation Brochure for "Mearl Iridescent Film", Peekskill, NY, 1986.
(Continued)

*Primary Examiner* — Tabassom Tadayyon Eslami
(74) *Attorney, Agent, or Firm* — Mannava & Kang, P.C.

(57) ABSTRACT

In a printed article, pigment flakes are magnetically aligned so as to form curved patterns in a plurality of cross-sections normal a continuous imaginary line, wherein radii of the curved patterns increase along the imaginary line from the first point to the second point. When light is incident upon the aligned pigment flakes from a light source, light reflected from the aligned pattern forms a bright image which appears to gradually change its shape and move from one side of the continuous imaginary line to another side of the continuous imaginary line when the substrate is tilted with respect to the light source.

13 Claims, 14 Drawing Sheets

Related U.S. Application Data division of application No. 14/797,864, filed on Jul. 13, 2015, now Pat. No. 10,232,660, which is a division of application No. 13/737,811, filed on Jan. 9, 2013, now Pat. No. 9,102,195.

(60) Provisional application No. 61/585,954, filed on Jan. 12, 2012.

(51) Int. Cl.

| | | |
|---|---|---|
| B42D 25/342 | (2014.01) | |
| B42D 25/41 | (2014.01) | |
| B42D 25/378 | (2014.01) | |
| B05D 3/00 | (2006.01) | |
| B05D 5/06 | (2006.01) | |
| C09D 5/29 | (2006.01) | |
| C09D 5/36 | (2006.01) | |
| B41M 3/14 | (2006.01) | |
| C09D 11/00 | (2014.01) | |
| B41M 7/00 | (2006.01) | |
| C09D 7/61 | (2018.01) | |
| B44F 1/02 | (2006.01) | |
| B42D 25/29 | (2014.01) | |
| H01F 41/02 | (2006.01) | |
| B42D 25/00 | (2014.01) | |

(52) U.S. Cl.
CPC ............ *B41M 7/0072* (2013.01); *B42D 25/00* (2014.10); *B42D 25/29* (2014.10); *B42D 25/342* (2014.10); *B42D 25/378* (2014.10); *B42D 25/41* (2014.10); *B44F 1/02* (2013.01); *B44F 1/10* (2013.01); *C09D 5/29* (2013.01); *C09D 5/36* (2013.01); *C09D 7/61* (2018.01); *C09D 11/00* (2013.01); *H01F 41/0253* (2013.01)

(56) References Cited

U.S. PATENT DOCUMENTS

| | | | |
|---|---|---|---|
| 3,123,490 A | 3/1964 | Bolomey et al. | 106/291 |
| 3,338,730 A | 8/1967 | Slade et al. | 428/142 |
| 3,610,721 A | 10/1971 | Abramson et al. | 350/3.5 |
| 3,627,580 A | 12/1971 | Krall | 117/238 |
| 3,633,720 A | 1/1972 | Tyler | 400/105 |
| 3,676,273 A | 7/1972 | Graves | 161/3 |
| 3,790,407 A | 2/1974 | Merton et al. | 428/148 |
| 3,791,864 A | 2/1974 | Steingroever | 117/238 |
| 3,845,499 A | 10/1974 | Ballinger | 346/74.3 |
| 3,853,676 A | 12/1974 | Graves | 161/5 |
| 3,873,975 A | 3/1975 | Miklos et al. | 360/25 |
| 4,011,009 A | 3/1977 | Lama et al. | 359/571 |
| 4,054,922 A | 10/1977 | Fichter | 346/74.3 |
| 4,066,280 A | 1/1978 | LaCapria | 283/7 |
| 4,126,373 A | 11/1978 | Moraw | 359/2 |
| 4,155,627 A | 5/1979 | Gale et al. | 359/568 |
| 4,168,983 A | 9/1979 | Vittands et al. | 106/14.12 |
| 4,197,563 A | 4/1980 | Michaud | 346/74.3 |
| 4,244,998 A | 1/1981 | Smith | 428/195.1 |
| 4,271,782 A | 6/1981 | Bate et al. | 118/623 |
| 4,310,584 A | 1/1982 | Cooper et al. | 428/212 |
| 4,398,798 A | 8/1983 | Krawczak et al. | 359/573 |
| 4,434,010 A | 2/1984 | Ash | 106/415 |
| 4,543,551 A | 9/1985 | Peterson | 335/284 |
| 4,705,300 A | 11/1987 | Berning et al. | 283/91 |
| 4,705,356 A | 11/1987 | Berning et al. | 350/166 |
| 4,721,217 A | 1/1988 | Phillips et al. | 215/230 |
| 4,756,771 A | 7/1988 | Brodalla et al. | 148/244 |
| 4,779,898 A | 10/1988 | Berning et al. | 283/58 |
| 4,788,116 A | 11/1988 | Hochberg | 430/21 |
| 4,838,648 A | 6/1989 | Phillips et al. | 359/585 |
| 4,867,793 A | 9/1989 | Franz et al. | 106/415 |
| 4,923,533 A | 5/1990 | Shigeta et al. | 148/304 |
| 4,930,866 A | 6/1990 | Berning et al. | 359/589 |
| 4,931,309 A | 6/1990 | Komatsu et al. | 427/599 |
| 5,002,312 A | 3/1991 | Phillips et al. | 283/72 |
| 5,009,486 A | 4/1991 | Dobrowolski et al. | 359/580 |
| 5,059,245 A | 10/1991 | Phillips et al. | 106/31.65 |
| 5,079,058 A | 1/1992 | Tomiyama | 428/40 |
| 5,079,085 A | 1/1992 | Hashimoto et al. | 428/327 |
| 5,084,351 A | 1/1992 | Phillips et al. | 428/411.1 |
| 5,106,125 A | 4/1992 | Antes | 283/91 |
| 5,128,779 A | 7/1992 | Mallik | 359/2 |
| 5,135,812 A | 8/1992 | Phillips et al. | 428/403 |
| 5,142,383 A | 8/1992 | Mallik | 359/2 |
| 5,171,363 A | 12/1992 | Phillips et al. | 106/31.65 |
| 5,177,344 A | 1/1993 | Pease | 235/449 |
| 5,186,787 A | 2/1993 | Phillips et al. | 216/36 |
| 5,192,611 A | 3/1993 | Tomiyama et al. | 428/354 |
| 5,214,530 A | 5/1993 | Coombs et al. | 359/359 |
| 5,223,360 A | 6/1993 | Prengel et al. | 430/39 |
| 5,254,390 A | 10/1993 | Lu | 428/156 |
| 5,278,590 A | 1/1994 | Phillips et al. | 359/589 |
| 5,279,657 A | 1/1994 | Phillips et al. | 106/31.65 |
| 5,339,737 A | 8/1994 | Lewis et al. | 101/454 |
| 5,364,467 A | 11/1994 | Schmid et al. | 106/404 |
| 5,364,689 A | 11/1994 | Kashiwagi et al. | 428/195 |
| 5,368,898 A | 11/1994 | Akedo | 427/510 |
| 5,411,296 A | 5/1995 | Mallik | 283/86 |
| 5,424,119 A | 6/1995 | Phillips et al. | 428/328 |
| 5,437,931 A | 8/1995 | Tsai et al. | 428/446 |
| 5,447,335 A | 9/1995 | Haslop | 283/91 |
| 5,464,710 A | 11/1995 | Yang | 430/1 |
| 5,474,814 A | 12/1995 | Komatst et al. | 427/549 |
| 5,549,774 A | 8/1996 | Miekka et al. | 156/209 |
| 5,549,953 A | 8/1996 | Li | 428/64.1 |
| 5,571,624 A | 11/1996 | Phillips et al. | 428/403 |
| 5,591,527 A | 1/1997 | Lu | 428/411.1 |
| 5,613,022 A | 3/1997 | Odhner et al. | 385/37 |
| 5,624,017 A | 4/1997 | Plesko | |
| 5,624,076 A | 4/1997 | Miekka et al. | 241/3 |
| RE35,512 E | 5/1997 | Nowak et al. | 101/454 |
| 5,627,663 A | 5/1997 | Horan et al. | 359/2 |
| 5,629,068 A | 5/1997 | Miekka et al. | 428/148 |
| 5,630,877 A | 5/1997 | Kashiwagi et al. | 118/623 |
| 5,648,165 A | 7/1997 | Phillips et al. | 428/346 |
| 5,650,248 A | 7/1997 | Miekka et al. | 430/1 |
| 5,672,410 A | 9/1997 | Miekka et al. | 428/148 |
| 5,700,550 A | 12/1997 | Uyama et al. | 428/212 |
| 5,742,411 A | 4/1998 | Walters | 359/2 |
| 5,744,223 A | 4/1998 | Abersfelder et al. | 428/206 |
| 5,763,086 A | 6/1998 | Schmid et al. | 428/404 |
| 5,811,775 A | 9/1998 | Lee | 235/457 |
| 5,815,292 A | 9/1998 | Walters | 359/2 |
| 5,856,048 A | 1/1999 | Tahara et al. | 430/1 |
| 5,858,078 A | 1/1999 | Andes et al. | 106/437 |
| 5,907,436 A | 5/1999 | Perry et al. | 359/576 |
| 5,912,767 A | 6/1999 | Lee | 359/567 |
| 5,989,626 A | 11/1999 | Coombs et al. | 427/162 |
| 5,991,078 A | 11/1999 | Yoshitake et al. | 359/567 |
| 6,013,370 A | 1/2000 | Coulter et al. | 428/403 |
| 6,031,457 A | 2/2000 | Bonkowski et al. | 340/572.1 |
| 6,033,782 A | 3/2000 | Hubbard et al. | 428/407 |
| 6,043,936 A | 3/2000 | Large | 359/572 |
| 6,045,230 A | 4/2000 | Dreyer et al. | 359/529 |
| 6,060,143 A | 5/2000 | Tompkin et al. | 428/64.1 |
| 6,068,691 A | 5/2000 | Miekka et al. | 106/403 |
| 6,103,361 A | 8/2000 | Batzar et al. | 428/323 |
| 6,112,388 A | 9/2000 | Kimoto et al. | 29/17.3 |
| 6,114,018 A | 9/2000 | Phillips et al. | 428/200 |
| 6,150,022 A | 11/2000 | Coulter et al. | 428/403 |
| 6,157,489 A | 12/2000 | Bradley, Jr. et al. | 359/584 |
| 6,168,100 B1 | 1/2001 | Kato et al. | 241/1 |
| 6,241,858 B1 | 6/2001 | Phillips et al. | 204/192.15 |
| 6,242,510 B1 | 6/2001 | Killey | 523/204 |
| 6,243,204 B1 | 6/2001 | Bradley, Jr. et al. | 359/585 |
| 6,403,169 B1 | 6/2002 | Hardwick et al. | 427/548 |
| 6,549,131 B1 | 4/2003 | Cote et al. | 340/572.1 |
| 6,586,098 B1 | 7/2003 | Coulter et al. | 428/40 |
| 6,589,331 B2 | 7/2003 | Ostertag et al. | 106/460 |
| 6,643,001 B1 | 11/2003 | Faris | 356/37 |
| 6,649,256 B1 | 11/2003 | Buczek et al. | 428/323 |

(56) References Cited

U.S. PATENT DOCUMENTS

| | | | |
|---|---|---|---|
| 6,686,027 B1 | 2/2004 | Caporaletti et al. | 428/195.1 |
| 6,692,031 B2 | 2/2004 | McGrew | 283/93 |
| 6,692,830 B2 | 2/2004 | Argoitia et al. | 428/403 |
| 6,712,399 B1 | 3/2004 | Drinkwater et al. | 283/111 |
| 6,749,777 B2 | 6/2004 | Argoitia et al. | 252/582 |
| 6,749,936 B2 | 6/2004 | Argoitia et al. | 428/402 |
| 6,751,022 B2 | 6/2004 | Phillips | 359/577 |
| 6,759,097 B2 | 7/2004 | Phillips et al. | 427/510 |
| 6,761,959 B1 | 7/2004 | Bonkowski et al. | 428/156 |
| 6,808,806 B2 | 10/2004 | Phillips et al. | 428/403 |
| 6,815,065 B2 | 11/2004 | Argoitia et al. | 428/403 |
| 6,818,299 B2 | 11/2004 | Phillips et al. | 428/403 |
| 6,838,166 B2 | 1/2005 | Phillips et al. | 428/323 |
| 6,841,238 B2 | 1/2005 | Argoitia et al. | 428/323 |
| 6,902,807 B1 | 6/2005 | Argoitia et al. | 428/403 |
| 6,987,590 B2 | 1/2006 | Phillips et al. | 359/2 |
| 7,029,525 B1 | 4/2006 | Mehta | 106/31.6 |
| 7,047,883 B2 | 5/2006 | Raksha et al. | 101/489 |
| 7,604,855 B2 | 10/2009 | Raksha et al. | 428/195.1 |
| 7,625,632 B2 | 12/2009 | Argoitia | 428/402 |
| 2002/0182383 A1 | 12/2002 | Phillips et al. | 428/199 |
| 2003/0058491 A1 | 3/2003 | Holmes et al. | 359/2 |
| 2003/0087070 A1 | 5/2003 | Souparis | 283/91 |
| 2003/0165637 A1 | 9/2003 | Phillips et al. | 427/598 |
| 2003/0190473 A1 | 10/2003 | Argoitia et al. | 428/403 |
| 2004/0009309 A1 | 1/2004 | Raksha et al. | 283/57 |
| 2004/0051297 A1* | 3/2004 | Raksha | B41M 3/00 283/57 |
| 2004/0081807 A1 | 4/2004 | Bonkowski et al. | 428/195.1 |
| 2004/0094850 A1 | 5/2004 | Bonkowski et al. | 264/1.34 |
| 2004/0100707 A1 | 5/2004 | Kay et al. | 359/883 |
| 2004/0105963 A1 | 6/2004 | Bonkowski et al. | 428/195.1 |
| 2004/0151827 A1 | 8/2004 | Argoitia et al. | 427/7 |
| 2005/0037192 A1 | 2/2005 | Argoitia et al. | 428/323 |
| 2005/0063067 A1 | 3/2005 | Phillips et al. | 359/614 |
| 2005/0106367 A1* | 5/2005 | Raksha | B05D 5/061 428/199 |
| 2005/0123755 A1 | 6/2005 | Argoitia et al. | 428/402 |
| 2005/0128543 A1 | 6/2005 | Phillips et al. | 359/15 |
| 2005/0133117 A1* | 6/2005 | Tayu | H01F 1/08 148/105 |
| 2005/0189060 A1 | 9/2005 | Huang et al. | 156/99 |
| 2006/0035080 A1 | 2/2006 | Argoitia | 428/402 |
| 2006/0077496 A1 | 4/2006 | Argoitia et al. | 359/2 |
| 2006/0097515 A1* | 5/2006 | Raksha | B44F 1/10 283/91 |
| 2006/0198998 A1* | 9/2006 | Raksha | B42D 25/29 428/323 |
| 2006/0202469 A1 | 9/2006 | Teitelbaum | |
| 2006/0263539 A1 | 11/2006 | Argoitia | 427/547 |
| 2007/0058227 A1 | 3/2007 | Raksha et al. | 359/2 |
| 2007/0224398 A1 | 9/2007 | Raksha et al. | |
| 2007/0237891 A1 | 10/2007 | Sugiura et al. | |
| 2008/0171144 A1 | 7/2008 | Raksha et al. | 427/162 |
| 2010/0040799 A1 | 2/2010 | Raksha et al. | 427/550 |
| 2010/0040845 A1* | 2/2010 | Schmid | B42D 25/23 428/207 |
| 2011/0011937 A1 | 1/2011 | Holmes et al. | |
| 2011/0121556 A1 | 5/2011 | Raksha et al. | 283/57 |
| 2011/0168088 A1 | 7/2011 | Raksha et al. | 118/600 |
| 2011/0290129 A1* | 12/2011 | Gygi | B41M 7/0036 101/150 |
| 2013/0029112 A1* | 1/2013 | Bargir | B42D 25/369 428/195.1 |

FOREIGN PATENT DOCUMENTS

| | | | |
|---|---|---|---|
| DE | 3932505 | 4/1991 | B44F 1/12 |
| DE | 4212290 | 5/1993 | |
| DE | 4343387 | 6/1995 | B44F 1/12 |
| DE | 19611383 | 9/1997 | B44F 1/12 |
| DE | 19731968 | 1/1999 | B44F 1/12 |
| DE | 19744953 | 4/1999 | B44F 1/12 |
| DE | 19639165 | 10/2003 | C09B 67/02 |
| EP | 0138194 | 10/1984 | B32B 27/08 |
| EP | 0185396 | 12/1985 | D21H 5/10 |
| EP | 0341002 B2 | 11/1989 | G02B 5/28 |
| EP | 0420261 | 4/1991 | G06K 19/00 |
| EP | 0453131 | 10/1991 | |
| EP | 0556449 B1 | 8/1993 | B05D 3/14 |
| EP | 0406667 B1 | 1/1995 | B44C 1/00 |
| EP | 0660262 | 1/1995 | G06K 19/16 |
| EP | 0170439 | 4/1995 | G02B 5/20 |
| EP | 0710508 A1 | 5/1996 | B05D 3/14 |
| EP | 0756945 | 2/1997 | B42D 15/00 |
| EP | 0395410 | 8/1997 | G02B 5/20 |
| EP | 0698256 | 10/1997 | G06K 19/14 |
| EP | 0741370 | 5/1998 | G06K 19/18 |
| EP | 0914261 | 5/1999 | B42D 15/10 |
| EP | 0953937 A1 | 11/1999 | G06K 19/08 |
| EP | 0978373 | 2/2000 | B32B 7/02 |
| EP | 1174278 | 1/2002 | |
| EP | 1239307 | 9/2002 | G02B 5/22 |
| EP | 1353197 | 10/2003 | G02B 5/18 |
| EP | 1498545 A | 1/2005 | D21H 21/42 |
| EP | 1516957 | 3/2005 | D21H 21/42 |
| EP | 1529653 | 5/2005 | B42D 15/00 |
| EP | 1719636 | 11/2006 | B42D 15/10 |
| EP | 1741757 | 1/2007 | C09C 1/00 |
| EP | 2266710 A2 | 12/2010 | B05D 3/14 |
| GB | 1107395 | 3/1968 | G03G 1/00 |
| GB | 1131038 | 10/1968 | B44F 3/00 |
| JP | 63172779 | 7/1988 | C09C 3/04 |
| JP | 11010771 | 1/1999 | B32B 7/02 |
| JP | 2007176155 | 7/2007 | |
| WO | 1988007214 | 9/1988 | G02B 5/128 |
| WO | 1993023251 | 11/1993 | B41M 3/14 |
| WO | 1995013569 | 5/1995 | G03F 7/00 |
| WO | 1995017475 | 6/1995 | C09C 1/00 |
| WO | 1997019820 | 6/1997 | B42D 15/10 |
| WO | 1998012583 | 3/1998 | G02B 5/28 |
| WO | 2000008596 | 2/2000 | G06K 19/06 |
| WO | 2001003945 | 1/2001 | B42D 15/10 |
| WO | 2001053113 | 7/2001 | B42D 15/10 |
| WO | 2002000446 | 1/2002 | B42D 15/10 |
| WO | 2002004234 | 1/2002 | B44F 1/10 |
| WO | 2002040599 | 5/2002 | C09C 1/00 |
| WO | 2002040600 | 5/2002 | C09C 1/00 |
| WO | 2002053677 | 7/2002 | B42D 15/10 |
| WO | 2002090002 | 11/2002 | B05D 15/10 |
| WO | 2003011980 | 2/2003 | C09C 1/00 |
| WO | 2003102084 | 12/2003 | C09C 1/00 |
| WO | 2004007096 | 1/2004 | B05D 5/06 |
| WO | 2004024836 | 3/2004 | C09D 5/36 |
| WO | 2005000585 | 1/2005 | B41F 15/08 |
| WO | 2005017048 | 2/2005 | C09C 1/00 |
| WO | 2011092502 | 8/2011 | B41M 3/00 |

OTHER PUBLICATIONS

The R.D. Mathis Company Manual for "Thin Film Evaporation Source Reference", Long Beach, CA, Oct. 2004.

A. Argoitia, "Pigments Exhibiting a Combination of Thin Film and Diffractive Light Interference", AIMCAL Fall Technical Conference, 16th International Vacuum Web Coating Conference, Jan. 2002, pp. 1-9.

R. Donnick et al, "Influence of Nanosized Metal Clusters on the Generation of Strong Colors and Controlling of their Properties through Physical Vapor Deposition (PVD)", 49th Annual Technical Conference Proceedings (2006), Society of vacuum Coasters.

A. Argoitia et al, "The concept of printable holograms through the alignment of diffractive pigments", Electronic Imaging Science and Technology Proceedings, SPIE vol. 5310, Jan. 2004.

J.A. Dobrowolski et al., "Research on Thin Film Anticounterfeiting Coatings at the National Research Council of Canada", Applied Optics, vol. 28, No. 14, pp. 2702-2717 (Jul. 15, 1989).

R.L. van Renesse (Ed.), "Optical Document Security", 2$^{nd}$ Ed., Artech House, 254, 349-69 (1997).

Prokes et al (Ed.), Novel Methods of Nanoscale Wire Formation, Mat. Research Soc. Bul., pp. 13-14 (Aug. 1999).

(56) References Cited

OTHER PUBLICATIONS

Lotz et al, Optical Layers on Large Area Plastic Films, Precision, Applied Films (Nov. 2001).
A. Argoitia et al, "Pigments Exhibiting Diffractive Effects", Soc. of Vac. Coaters, 45$^{th}$ Annual Tech. Conf. Proceed. (2002).
P. Coombs et al, "Integration of contrasting technologies into advanced optical security devices", SPIE Conference on Document Security, Jan. 2004.
Llewellyn, "Dovids: Functional Beauty—discussion about holography", Paper, Film, and Foil Converter, Aug. 2002.
Hardin, "Optical tricks designed to foil counterfeiters", OE Reports, No. 191, Nov. 1999.
Powell et al (Ed), "Vapor Deposition" John Wiley & Sons, p. 132 (1996).
Himpsel et al, "Nanowires by Step Decoration", Mat. Research Soc. Bul., pp. 20-24 (Aug. 1999).
J.A. Dobrowolski, "Optical Thin-Film Security Devices", Optical Security Document, Rudolf van Renesse, Artech House, 1998, pp. 289-328.
R.L. van Renesse, "Paper Based Document Security—a Review", European Conference on Security and Detection, Apr. 28-30, 1997, Conference Publication No. 437, p. 75-80.
M.T. Gale, "Diffractive Microstructures for Security Applications", Paul Scherrer Institute, Zurich, IEEE Conference Publication London 1991, pp. 205-209, Sep. 16-18, 1991.
Definition of "directly" from Webster's Third New International Dictionary, 1993, p. 641.
J.M. McKiernan et al, "Luminescence and Laser Action of Coumarin Dyes Doped in Silicate and Aluminosilicate Glasses Prepared by Sol-Gel Technique", Journal of Inorganic and Organometallic Polymers, vol. 1, No. 1, 1991, pp. 87-103.
J.I. Zink et al, "Optical Probes and Properties of Aluminosilicate Glasses Prepared by The Sol-Gel Method", Polym. Mater. Sci. Eng., pp. 204-208 (1989).
R.W. Phillips et al, "Security Enhaneement of Holograms with Interference Coatings", Optical Security and Counterfeit Deterrence Techniques III Proceedings of SPIE vol. 3973, pp. 304-316 (2000).
D.W. Tomkins et al., "Transparent Overlays for Security Printing and Plastic ID Cards", pp. 1-8, Nov. 1997.
J.A. Dobrowolski et al, "Optical Interference Coatings for Inhibiting of Counterfeiting", Optica Acta, 1973, vol. 20, No. 12, 925-037.
Minolta Manual for "Precise Color Communication, Color Control From Feeling to Instrumentation", pp. 18, 20, 22-23, 46-49.
F. Defilet, "Kinegrams 'Optical Variable Devices' (OVD's) for Banknotes, Security Documents and Plastic Cards", LGZ Landis & Gyr Zug Corporation, San Diego, Apr. 1-3, 1987.
S.P. McGrew, "Hologram Counterfeiting: Problems and Solutions", SPIE, vol. 1210 Optical Security and Anticounterfeiting Systems, 1990, pp. 66-76.
R.L. van Renesse, "Security Design Of Valuable Documents And Products", SPIE, vol. 2659, Jun. 1996, pp. 10-20.
Steve McGrew, "Countermeasures Against Hologram Counterfeiting", Internet site www.iea.com/nli/publications/countermeasures.htm, Jan. 6, 2000.
R.W. Phillips, "Optically Variable Films, Pigments, and Inks", SPIE vol. 1323 Optical Thin Films III: New Developments, 1990, pp. 98-109.
R.W. Phillips et al. "Optical Coatings for Document Security", Applied Optics, vol. 35, No. 28, Oct. 1, 1996 pp. 5529-5534.
J. Rolfe, "Optically Variable Devices for use on Bank Notes" SPIE, vol. 1210 Optical Security and Anticounterfeiting Systems, pp. 14-19, 1990.
OVD Kinegram Cor "OVD Kinegram Management of Light to Provide Security" Internet site www.kiknegram.com.xhome.html, Dec. 17, 1999.
I.M. Boswarva et al., "Roll Coater System for the Production of Optically Variable Devices (OVD's) for Security Applications", Proceedings, 33$^{rd}$ Annual technical Conference, Society of Vacuum Coaters, pp. 103-109 (1990).
Halliday et al., "Fundmental of Physics, Sixth Edition", p. 662, Jul. 2000.
PCT Search Report for corresponding PCT application No. PCT/US2013/020873.
PCT Search Report for related PCI application No. PCT/US2013/020885.
Search report from corresponding EP application No. EP13736068.
Search report from related EP application No. EP13735802.

* cited by examiner

Distance along the diagonal of the magnet from pole to pole

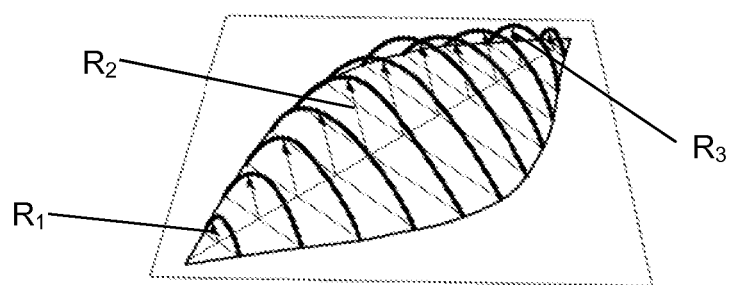
FIG. 18
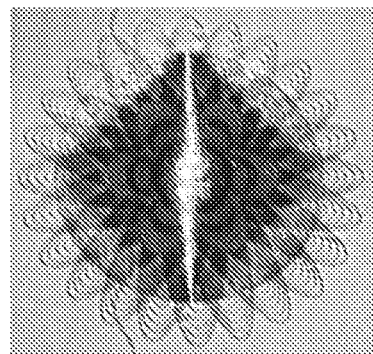
FIG. 19
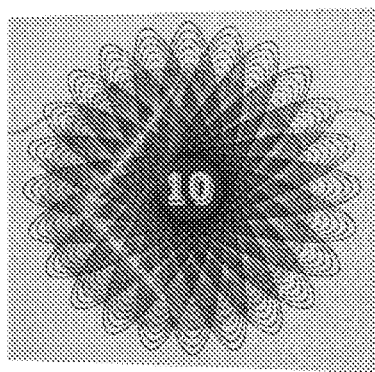 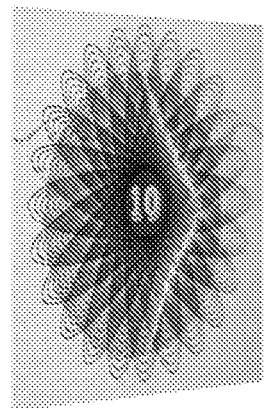
FIG. 20  FIG. 21

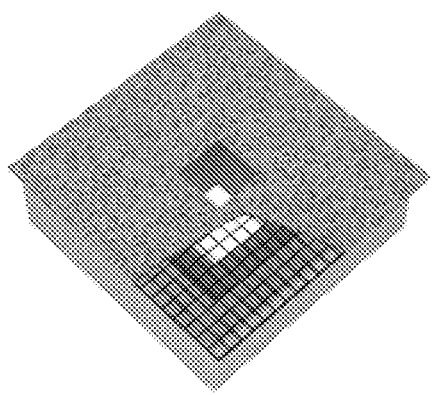
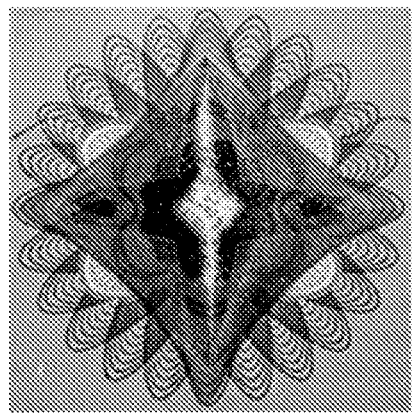
FIG. 25  FIG. 26
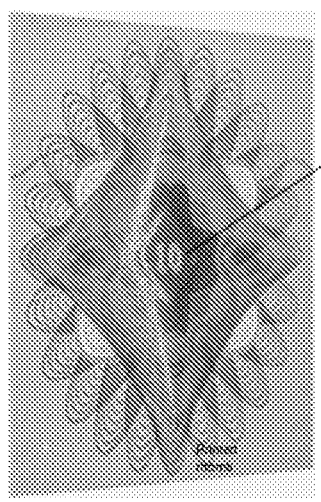
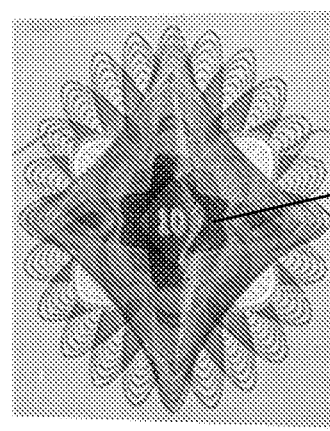
FIG. 27  FIG. 28

ARTICLE WITH CURVED PATTERNS FORMED OF ALIGNED PIGMENT FLAKES

CROSS-REFERENCE TO RELATED APPLICATIONS

The present invention is a Division of U.S. patent application Ser. No. 16/224,575, filed Dec. 18, 2018, now U.S. Pat. No. 10,562,333, issued Feb. 18, 2020, which is a Continuation of U.S. patent application Ser. No. 14/797,864, filed Jul. 13, 2015, now U.S. Pat. No. 10,232,660, issued Mar. 19, 2019, which is a Divisional of U.S. patent application Ser. No. 13/737,811 filed Jan. 9, 2013, now U.S. Pat. No. 9,102,195, issued Aug. 11, 2015, which claims priority from U.S. Provisional Patent Application No. 61/585,954 filed Jan. 12, 2012, the disclosures of which are hereby incorporated by reference in their entireties.

TECHNICAL FIELD

The present invention relates generally to optically variable devices and, more particularly, to aligning or orienting magnetic flakes in a painting or printing process in order to obtain a dynamic optical effect.

BACKGROUND OF THE INVENTION

Optically variable devices are used in a wide variety of applications, both decorative and utilitarian; for example, such devices are used as security devices on commercial products. Optically variable devices can be made in numerous ways and achieve a variety of effects. Examples of optically variable devices include holograms imprinted on credit cards and authentic software documentation, color-shifting images printed on banknotes and enhancing the surface appearance of items such as motorcycle helmets and wheel covers.

Optically variable devices can be made as a film or foil that is pressed, stamped, glued, or otherwise attached to an object, and can also be made using optically variable pigments. One type of optically variable pigments is commonly called color-shifting pigments because the apparent color of images appropriately printed with such pigments changes with the change of the angle of view and/or illumination. A common example is the numeral "20" printed with color-shifting pigments in the lower right-hand corner of a U.S. twenty-dollar bill, which serves as an anti-counterfeiting device.

Optically variable devices can also be made with magnetic pigments that are aligned with a magnetic field. After coating a product with a liquid ink or paint composition, a magnet with a magnetic field having a desirable configuration is placed on the underside of the substrate. Magnetically alignable flakes dispersed in a liquid organic medium orient themselves parallel to the magnetic field lines, tilting from the original orientation. This tilt varies from normal to the surface of a substrate to the original orientation, which included flakes essentially parallel to the surface of the product. The planar oriented flakes reflect incident light back to the viewer, while the reoriented flakes do not, providing the appearance of a three dimensional pattern in the coating.

Some anti-counterfeiting devices are covert, while others are intended to be noticed. Unfortunately, some optically variable devices that are intended to be noticed are not widely known because the optically variable aspect of the device is not sufficiently dramatic. For example, the color shift of an image printed with color-shifting pigments might not be noticed under uniform fluorescent ceiling lights, but is more noticeable in direct sunlight or under single-point illumination. This can make it easier for a counterfeiter to pass counterfeit notes without the optically variable feature because the recipient might not be aware of the optically variable feature, or because the counterfeit note might look substantially similar to the authentic note under certain conditions.

Accordingly, there is a need to mitigate the disadvantages of existing optical security devices. It is an object of the present invention to provide highly noticeable security devices where illusive optical effects are produced by magnetically aligned pigments, and which may be formed within high speed printing processes.

SUMMARY OF THE INVENTION

An article includes a substrate and a coating which contains pigment flakes in a binder and is supported by the substrate. Each of the pigment flakes includes a magnetic or magnetizable material for magnetic alignment of the pigment flakes, and the pigment flakes are aligned so as to form an aligned pattern wherein a portion of the pigment flakes have their substantially planar major surfaces parallel to the substrate along a continuous imaginary line on a surface of the substrate between first and second points thereof, and the pigment flakes form curved patterns in a plurality of cross-sections normal the continuous imaginary line so that radii of the curved patterns increase along the imaginary line from the first point to the second point. When light is incident upon the pigment flakes from a light source, light reflected from the aligned pattern forms a bright image which appears to gradually change its shape and move from one side of the continuous imaginary line to another side of the continuous imaginary line when the substrate is tilted with respect to the light source.

In one aspect of the invention, the article includes an image printed with a non-magnetic ink, under the coating comprising pigment flakes as described above. The radii of the curved patterns initially increase and then decrease along the continuous imaginary line, so that the bright image moves from one side to another side of the image.

In another aspect of the invention, an article includes a substrate and a coating which contains pigment flakes in a binder and is supported by the substrate. Each of the pigment flakes includes a magnetic or magnetizable material for magnetic alignment of the pigment flakes, and the pigment flakes are aligned so as to form an aligned pattern wherein a portion of the pigment flakes have their substantially planar major surfaces parallel to the substrate along a continuous imaginary line on a surface of the substrate between first and second points thereof, and the pigment flakes form curved patterns in a plurality of cross-sections normal the continuous imaginary line, and wherein the continuous imaginary line is a zigzag or wavy line between the first and second points. When light is incident upon the pigment flakes from a light source, light reflected from the image region forms a bright zigzag or wave which appears to move when the substrate is tilted with respect to the light source.

BRIEF DESCRIPTION OF THE DRAWINGS

The invention will be described in greater detail with reference to the accompanying drawings which represent preferred embodiments thereof, wherein:

FIG. 18 is a schematic diagram of a magnetic field produced by the magnetic assembly shown in FIG. 15;

FIG. 19 is a photograph of a printed article at a near-normal angle of observation;

FIG. 20 is a photograph of a printed article at a first angle of observation;

FIG. 21 is a photograph of a printed article at a second angle of observation;

FIG. 25 is a schematic diagram of a magnetic assembly;

FIG. 26-28 are photographs of a printed article;

DETAILED DESCRIPTION

A previously unknown effect has been discovered by the inventors in their search for new printed devices which would provide highly noticeable dynamic optical effects. It has been found that a square magnet magnetized through its diagonal may align magnetically alignable pigment flakes to produce a "boomerang" optical effect visible to a naked human eye and illustrated in FIGS. 1-3.

Figure 4:
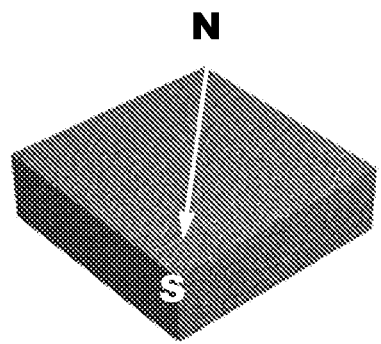
FIG. 4 is s a schematic diagram of a magnet.
Figure 5:
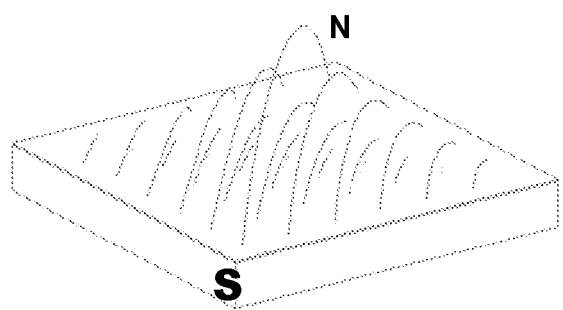
FIG. 5 is a schematic diagram of a magnetic field produced by the magnet shown in FIG. 4.

With reference to FIG. 4, a square magnet is magnetized through its diagonal; force lines of the magnetic field are illustrated in FIG. 5. The radii of the force lines change across the magnet. Consequently, the radii of the alignment formed of pigment flakes also change, which results in a dynamic image simultaneously moving and gradually changing its shape.

Figure 6:
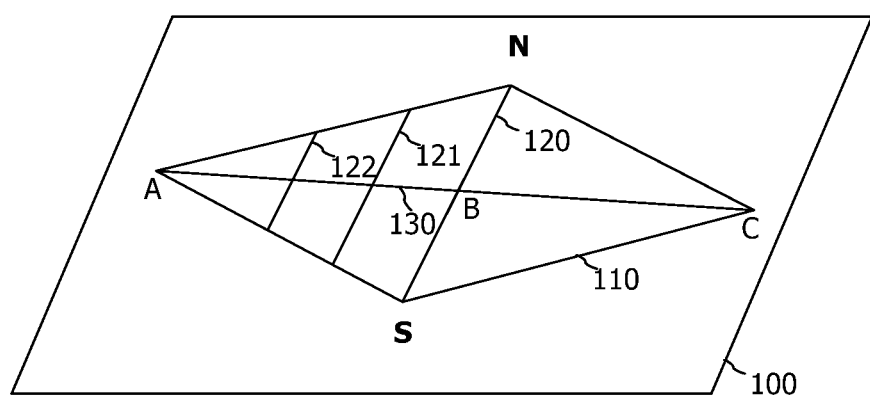
FIG. 6 is a schematic diagram of an image formed using the magnet shown in FIG. 4.
Figure 7:
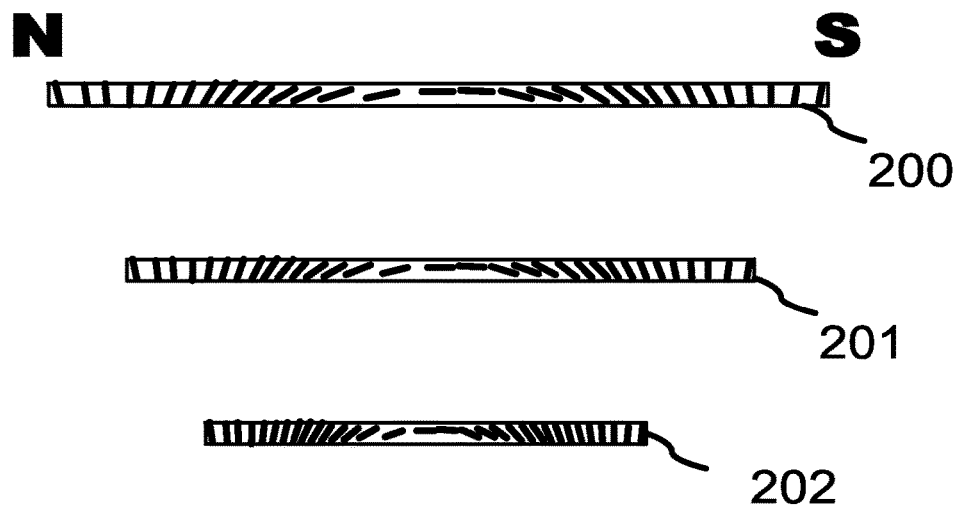
FIG. 7 (29b) is a schematic diagram of cross-sections of the image formed using the magnet shown in FIG. 4.

When an ink or paint containing magnetically alignable flakes is applied to a surface of a substrate, and the flakes are aligned using the magnet shown in FIG. 4, the flakes form an aligned pattern which may be described with reference to FIGS. 6 and 7. A substrate 100 has an imaginary contour 110 of the underlying magnet with poles indicated by "N" and "S"; in a cross-section 200 of the printed image cut along a line NS (FIG. 6), the magnetically alignable flakes form a curved pattern. Two other cross-sections 201 and 202 shown in FIG. 7 are parallel to the cross-section 200 and are schematically shown as lines 121 and 122 in FIG. 6. Notably, in the cross-sections 201 and 202, the magnetically alignable flakes also form curved patterns however characterized by lesser radii than in the cross-section 200.

In general, in cross-sections normal to a continuous imaginary line 130 between points A and B, the magnetically alignable flakes form a curved patterns wherein radii of the curved patterns increase along the imaginary line when moving from A to B, wherein a radius of a curved pattern formed by flakes in a cross-section of a coating is understood as an average radius of a curve formed by head-to-tail connection of the flakes. Preferably, the radii of the curved patterns decrease further along the imaginary line, i.e. beyond the point B (FIG. 6) so that the bright image moving across the imaginary symmetry axis included a full, two-prong boomerang. It is especially advantageous to have a full boomerang when an underlying image, e.g. printed with a non-magnetic ink, includes a symbol or logo or any other localized image whereabout the bright boomerang appears to move, possibly partially covering the image at times.

The concentration of the magnetically alignable flakes in the ink or paint may be between 4 and 25% by weight, preferably between 4 and 14 wt % so that the underlying graphical pattern or solid background is visible in the regions adjacent to the bright image, i.e. to minimize shading outside of the bright image. It has been found that, counter intuitively, bright dynamic images printed with a diluted ink have better defined shapes and are more distinct from the background than frames printed with high-concentration inks. Apparently, a diluted magnetic ink allows removal of unwanted effects and shadows. In particular, the background overprinted with a low-concentration magnetic ink is visible through the magnetic ink practically everywhere, with the exception of a region where the magnetically alignable flakes are aligned in a predetermined manner so as to focus reflected light to form a bright image.

For focusing, or concentrating the reflected light, the magnetic reflective flakes are aligned in a curved pattern such that a cross-section of the pattern includes flakes aligned parallel to the substrate in the central part of the pattern defined by the imaginary line 130, and also includes flakes tilted so that the angles between the flakes and the substrate gradually increases in the direction from the imaginary line 130 to the outer edge of the pattern. The flakes may be thought of as forming a Fresnel reflector which focuses reflected light into a bright image visible to an observer. It turned out that the diluted ink with the concentration in the range of between 4 and 14 wt % provides an adequately noticeable image formed by the focusing pattern of aligned reflective flakes.

The continuous imaginary line 130 on the surface of the substrate is defined by the underlying magnet and is orthogonal to the magnetic lines on the surface of the magnet used for aligning the flakes. A portion of the magnetically alignable flakes which are directly above the continuous imaginary line 130 are parallel to the substrate along the segments AB and BC.

Figure 8:
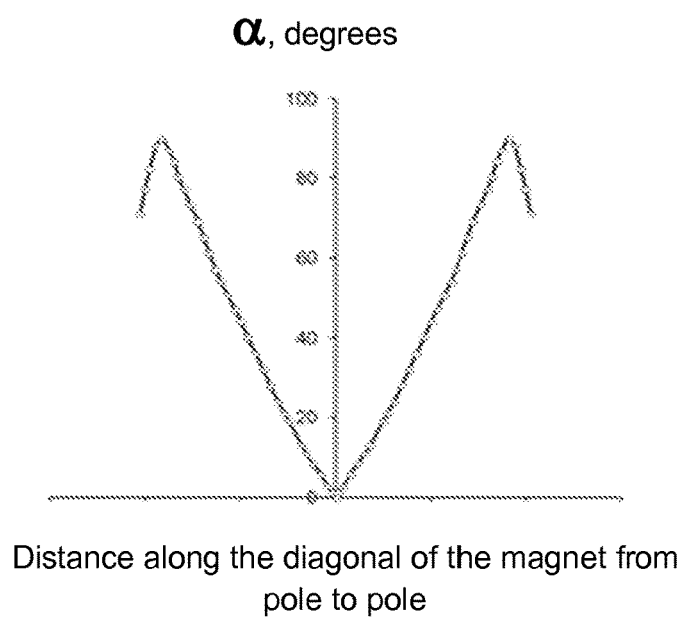
FIG. 8 is a plot of angles formed by the flakes in a cross-section shown in FIG. 7.

FIG. 8 is a plot of angles formed by the magnetically alignable flakes in the cross-section 200 shown in FIG. 7, i.e. in the direction from South to North poles of the magnet shown in FIG. 5. The flakes may be aligned so that in most, or at least in one of the plurality cross-sections, angles that the magnetically aligned flakes form with the substrate increase from zero at the imaginary line to 80 degrees on both sides of the imaginary line, preferably to 85, and ideally—to the normal direction (90 degrees) as shown in FIG. 8, obtained by computer simulation of a magnetic field produced by the described magnet with the help of the Amperes, a three-dimensional magnetic field solver from Integrated Engineering Software (integratedsoft.com).

In order for the boomerang optical effect to be visible to a naked human eye, the pattern of the pigment flakes should have a sufficient size. For example, the width of the curved pattern in the maximal cross-section 200 between the two points with the 80 degrees tilt is preferably within the range of from 8 to 25 mm.

Figure 9:
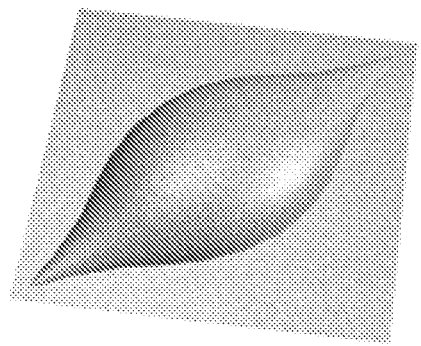
FIG. 9 is an illustration of a reflecting surface formed by the flakes aligned using the magnet shown in FIG. 4.

FIG. 9 presents a 3-D reflecting surface, formed by the flakes aligned in the field of the magnet shown in FIG. 4 when the flakes are joined head-to-tail. The reflecting surface shows the change of radius discussed above with reference to cross-sections 200 through 202.

Figure 1:
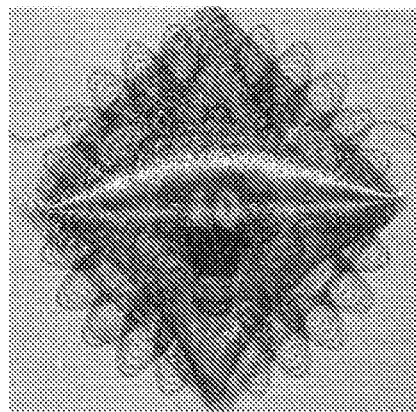
FIG. 1 is a photograph of a printed article at the normal angle of observation.
Figure 2:
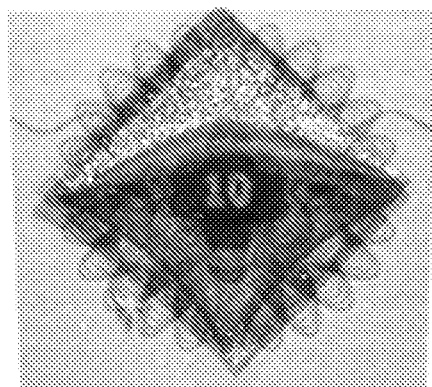
FIG. 2 is a photograph of the printed article shown in FIG. 1 at a first angle of observation.
Figure 3:
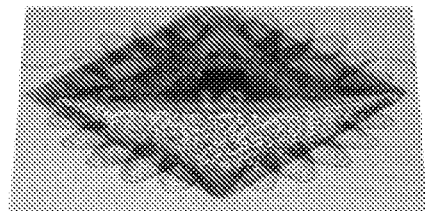
FIG. 3 is a photograph of the printed article shown in FIG. 1 at a second angle of observation.

FIGS. 1 through 3 show photographs of the resulting article taken from a variety of angles, which of course produce the same effect as tilting the article relative to a light source whereas the observer remains stationary. When light is incident upon the magnetically alignable flakes from a light source, light reflected from the article forms a curved bright image which appears to gradually change its shape resembling a boomerang at some point, and gradually approaching the line 130 to move from one side of the imaginary line 130 to another side of the imaginary line when the substrate is tilted with respect to the light source. The continuous imaginary line 130 is the axis of symmetry whereabout the bright illusive image gradually flips and thus the continuous imaginary line 130 defines the image.

Optionally, the article includes at least a background printed or painted so at to provide a coating containing non-magnetic pigments, so that the bright image would appear to move relative to the background. Preferably, the underlying non-magnetic coating provides an image and the radii of the curved patterns initially increase and then decrease along the continuous imaginary line, so that the bright image moves from one side to another side of the image as shown in FIGS. 1 through 3.

In the particular example discussed above, the curved patterns formed by the flakes in the cross-sections of the coating are convex patterns; however, other magnetic arrangements or printing techniques may result in concave patterns. By way of example, the magnetic ink or paint may be provided onto a transparent plastic support; the magnetically aligned flakes may be aligned with the magnet shown in FIG. 4, and then the plastic support may be applied to a document or other object with the printed side adjacent to the surface of the document as discussed further with reference to FIGS. 19 through 21. For an observer looking at the document or object, the magnetically aligned flakes would form a concave pattern in the cross-sections of the ink, and the bright image would also produce a boomerang effect by gradually changing its shape and flipping from one side of the imaginary line to another side of the imaginary line.

Additionally, a variety of magnets may be used in place of the square magnet, including magnets with a planar surface (e.g. circle or diamond) parallel to the magnetic axis of the magnet. In case of a symmetric magnet or magnetic assembly, the imaginary line is a straight line with serves as an axis of symmetry for the moving image. In case of an asymmetric magnet, the imaginary line where the flakes are aligned parallel to the substrate is a curve.

Figure 10:
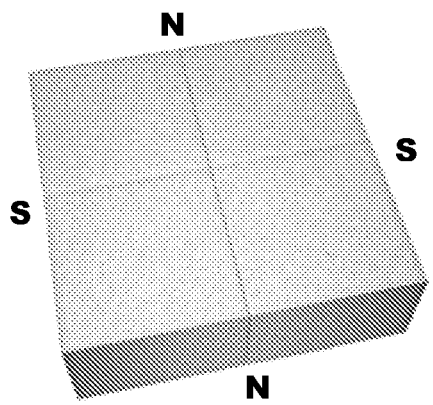
FIG. 10 is a schematic diagram of a magnetic assembly including four magnets as shown in FIG. 4.
Figure 11:
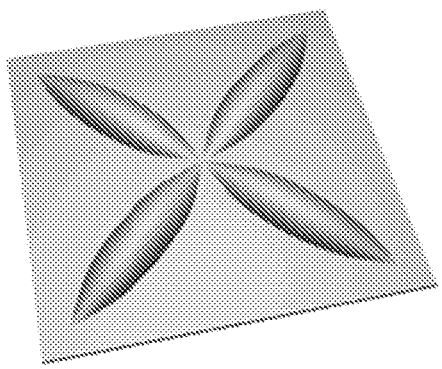
FIG. 11 is an illustration of a reflecting surface formed by the flakes aligned using the magnetic assembly shown in FIG. 10.

A combination of several magnets, assembled together, allows producing more complicated optical effects based on the aforediscussed alignment of magnetically alignable flakes. With reference to FIG. 10, a magnetic assembly includes four identical square magnets assembled together; the four magnets have the same size and diagonal magnetization as shown in FIG. 4, and are kept together by brackets (not shown). FIG. 11 illustrates a reflective surface produced by head-to-tail connection of magnetically alignable flakes aligned in the field of the assembly shown in FIG. 10.

Figure 12:
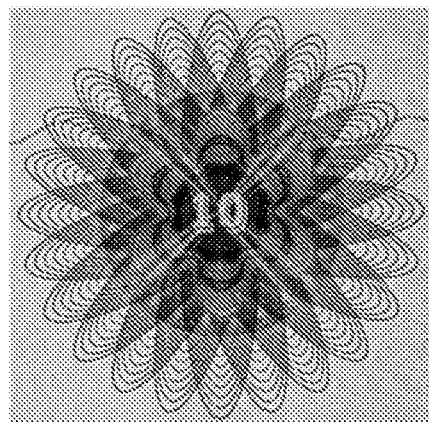
FIG. 12 is a photograph of a printed article at the normal angle of observation.
Figure 13:
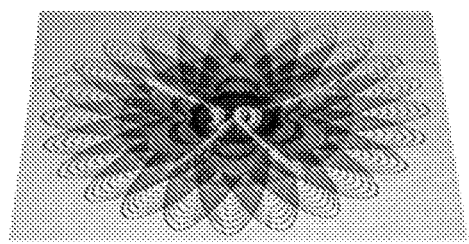
FIG. 13 is a photograph of a printed article at a first angle of observation.
Figure 14:
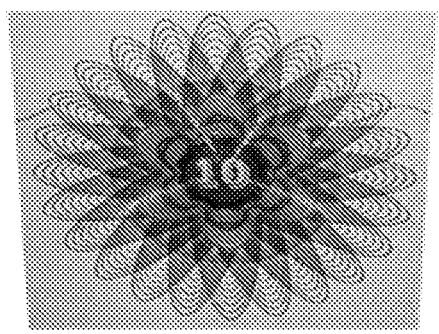
FIG. 14 is a photograph of a printed article at a second angle of observation.

FIGS. 12 through 14 are photographs of the resulting article wherein magnetically alignable flakes are aligned with the help of the magnetic assembly shown in FIG. 10. The photographs are taken with a camera at a variety of angles, which produce the same effect as tilting the article relative to a light source whereas the observer remains stationary. The photographs show a convex "Fairy Wings" optical effect. The pictures are made at different angles of observation. FIG. 12 shows the article at the normal angle of observation. FIG. 13 shows the article with its upper edge tilted away from the camera, and FIG. 14—with its upper edge tilted toward the camera. The article has the appearance of fairy wings flapping when the article is tilted.

Figure 15:
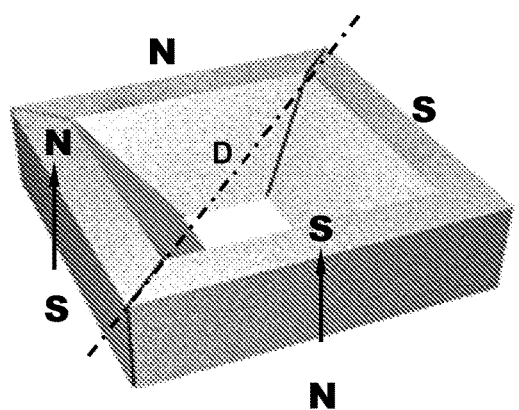
FIG. 15 is a schematic diagram of a magnetic assembly.
Figure 16:
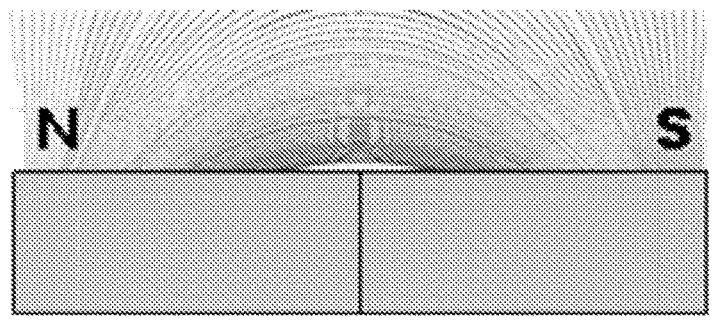
FIGS. 16 and 16A are schematic diagrams of a magnetic field produced by the magnetic assembly shown in FIG. 15.
Figure 16A:
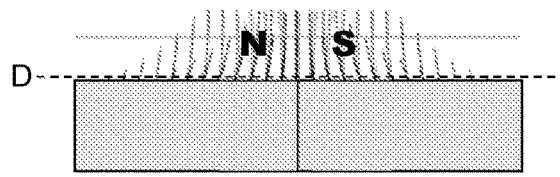
Figure 17:
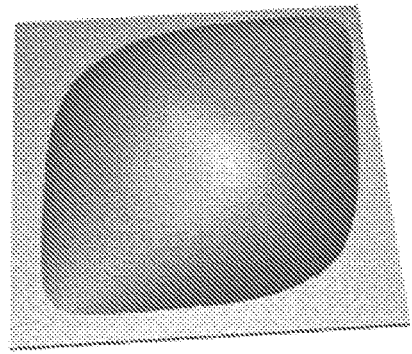
FIG. 17 is an illustration of a reflecting surface formed by the flakes aligned using the magnetic assembly shown in FIG. 15.

With reference to FIG. 15, an assembly of four magnets has a tapered extrusion cut though the center of the assembly. FIG. 16 illustrates a cross section view of the magnetic field along the diagonal D (FIG. 15) which represents the null zone of the magnetic assembly; the magnitude of the flux density along this diagonal is almost zero. FIG. 16A demonstrates the field in a cross-section perpendicular to the diagonal D. FIG. 17 presents a 3-D reflecting surface, formed by the flakes aligned in the field of the magnetic assembly shown in FIG. 15 when the flakes are joined head-to-tail. The reflecting surface has the change of radii as in FIG. 9. Accordingly, the assembly shown in FIG. 15 may be used for aligning magnetically alignable flakes to form an image such that light reflected from the aligned pattern would form a bright image which appears to gradually change its shape and move from one side of the continuous imaginary line to another side of the continuous imaginary line when the substrate is tilted with respect to the light source, as shown in FIGS. 19 through 21.

The characteristic feature of reflective surfaces in FIGS. 9, 11 and 17 is the variation of their radii. FIG. 18 shows that, along a straight imaginary line, the radius of the flake alignment initially increases, e.g. where the radius increases from R1 to R2>R1, and then decreases. Of course, other variations of the radii are possible.

FIGS. 19 through 21 are photographs of the resulting article wherein magnetically alignable flakes are aligned using the magnetic assembly shown in FIG. 15. The photographs are taken with a camera at a variety of angles, which produce the same effect as tilting the article relative to a light source whereas the observer remains stationary. The photographs show a "boomerang" optical effect produced by a concave alignment of the flakes fabricated by printing 5 wt. % Gold/Green Spark ink onto a thin transparent polyester sheet, exposing the ink to the field of the magnets shown in FIG. 15, curing the ink with UV light, and laminating the sheet with its printed side adjacent to a security Guilloche rosette of a paper substrate.

With reference to FIG. 19, at a near-normal angle of observation, the article exhibits a bright line at the middle thereof. The line has a wide central region and two tapered ends. FIG. 20 shows the article tilted to the left, and FIG. 21—to the right. At the left and right tilts, the bright image appears as a boomerang. When the sample is tilted from the left (right) to the right (left), it starts with the a boomerang (FIG. 20), then turns into a straight line with tapered ends when the angle becomes normal (FIG. 19) and later becomes a boomerang again when the sample is tilted to the right (FIG. 21).

The photographs in FIGS. 19-21 show a very attractive and eye-catching effect that may be used for anti-counterfeiting applications.

Figure 22:
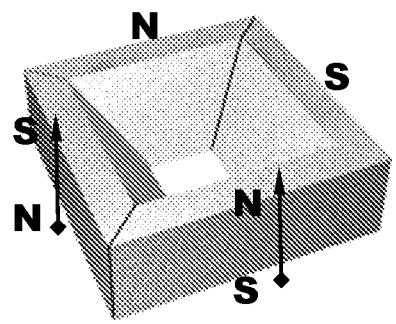
FIG. 22 is a schematic diagram of a magnetic assembly.
Figure 23:
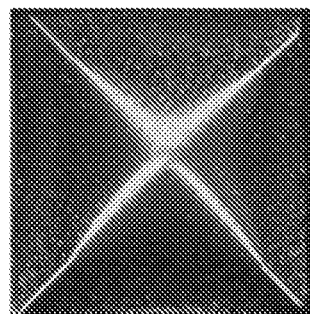
FIGS. 23 and 24 are photographs of a printed article.
Figure 24:
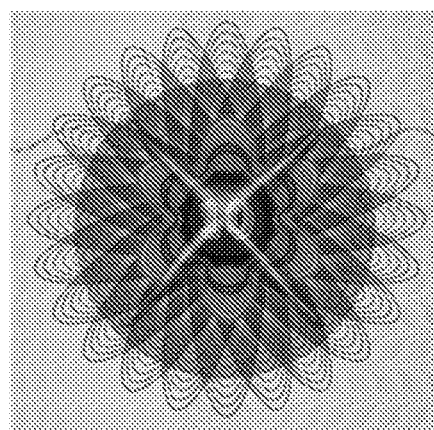

With reference to FIG. 22, another assembly of four magnets has a pyramidal extruded cut through the center of the assembly. The appearance of a "Spike" optical effect in the 15 wt % ink, printed on a black background, is demonstrated in FIG. 23. However, when the pigment concentration is reduced to 5 wt % and the ink is coated on the paper with a security graphics, the image becomes much more attractive as shown in FIG. 24.

With reference to FIG. 25, a magnetic assembly includes a diverter which may be a sheet of high or medium magnetic permeability. The purpose of a diverter is to deflect the field in a predetermined direction from its original direction. The diverter shown in FIG. 25 is a thin sheet of a metal with high magnetic permeability (supermalloy, mu-metal, permalloy, etc.). The thickness of the diverter may vary in a wide range and is defined by configuration of the field and the grade of the magnet. The diverter with a square cut in the center, shown in FIG. 25, was made from a 0.006" thick sheet of mu-metal. The diverter was placed directly on the top of the magnet shown in FIG. 22. The paper substrate, previously coated with wet ink containing dispersed magnetic flakes, was placed on the top of the diverter.

The ink was cured with UV light completion of the alignment of the flakes. As a result, aligned magnetic flakes have formed a convex reflective surface. The diverter deflected the field around the edges of the square cut, differently aligning the flakes in the margins of the cut. With reference to FIG. 26, a printed graphical component includes a Guilloche rosette, a dark colored rhomb, and a numeral in the center of the rosette. The rhomb has the same size as the cut in the diverter. The graphical component was overprinted with magnetic ink, and the magnetically alignable flakes within the ink were aligned using the magnetic assembly shown in FIG. 25. Magnetic flakes, deflected around the edges of the diverter, created an outline for the graphical image. The graphical components of the article in the FIG. 26 includes several guilloche patterns and a dark rhomb printed in the center of the graphical component and containing contrasting white numeral "10" in its center. FIG. 26 demonstrates the article printed with both graphical and optical components at the normal angle of observation. The effect appears as a shiny rhomb with two points emerging from it in opposite directions. The magnetically aligned rhomb appears to be opaque and obscures the graphical rhomb printed underneath the magnetically aligned optical component. The magnetically aligned effect changes when the sample is tilted with its right edge away from the observer (FIG. 27). Now, the opaque rhomb becomes transparent with a bright arrowhead outlining the printed graphical rhomb. The graphical printed rhomb with the numeral "10" is highly visible. When the sample is tilted with its left edge away from the observer, the effect moves in the opposite direction (FIG. 28). FIGS. 26 through 28 present the boomerang (or "swing") effect which has a spindle-like appearance widest in the middle and tapering at the top and at the bottom. The bright image gradually changes its shape and flips from the left side of a central vertical (with respect to the drawing) axis of the printed image to the right side of the axis. The effect is enabled by a curved alignment of the flakes, wherein flakes along the central vertical axis lie parallel to the substrate and, in cross-sections normal to the vertical axis, the flakes form arching patterns with radii of the arch increasing and then decreasing along the axis. The arrowhead feature shown in FIGS. 26-28 adjacent to two sides of the rhomb touching the boomerang when the sample is tilted. The portion of the flakes located close to the edges of the cut through magnetic deflector are locally distorted which results in the appearance of the arrowhead-like outline of the rhomb element of the graphical component.

It has been shown above that a variety of magnets and magnetic assemblies may be used for producing a boomerang effect defined by an imaginary line on a surface of the substrate, wherein light incident upon magnetically alignable flakes from a light source, is reflected from the article to form a curved bright region which appears to gradually change its shape and move from one side of the imaginary line to another side of the imaginary line when the substrate is tilted with respect to the light source. The magnetically alignable flakes are aligned so as to form an image defined by the imaginary line so that, in each of a plurality of cross-sections normal the imaginary line between first and second points thereof, the magnetically alignable flakes form a concave or convex pattern wherein a radius of the concave or convex pattern increases along the imaginary line from the first point to the second point. Preferably, the radius decreases beyond the second point so as to form an entire boomerang which appear to be a bent bright contoured frame with a wider middle portion and tapered ends. However, by way of example, one can print magnetic ink over only the lower half (with respect to the drawing in FIG. 4) of the magnet which would result in a half-boomerang effect which is also highly noticeable and may be used for security purposes.

Figure 29:
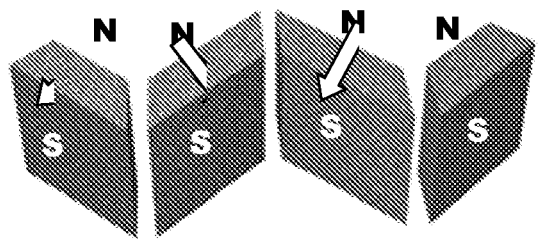
FIG. 29 is a schematic diagram of a magnetic assembly.
Figure 30:
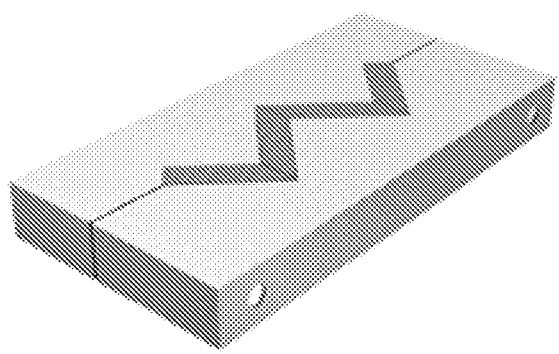
FIG. 30 is a schematic diagram of brackets used in the magnetic assembly shown in FIG. 29.
Figure 31:
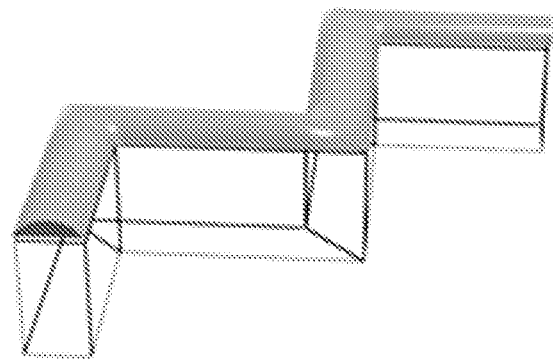
FIG. 31 is a schematic diagram of a magnetic field.

With reference to FIG. 29, a magnetic assembly includes four compression-bonded machinable neodymium-boron-iron magnets which have been cut as shown in FIG. 29 and are kept together by the brackets as shown in FIG. 30. Top surfaces of the magnets are aligned in a zigzag line. Each of the four magnets has its North and South poles on the side surfaces of the magnet. Accordingly, when a coating containing magnetically alignable flakes in a binder is printed onto a substrate and the substrate in then placed atop the assembly shown in FIG. 30, above each segment of the zigzag the flakes are aligned so that cross-sections normal to the segments of the zigzag line have the flake alignment 200 (FIG. 7). The magnetic assembly defines an imaginary continuous zigzag line on the surface of the substrate, and the angles which the magnetically alignable flakes form with the substrate decrease to zero and then increase in each of a plurality of cross-sections normal to the imaginary continuous zigzag line between two points of the line. The reflective surface corresponding to the alignment of the flakes produced by the assembly shown in FIG. 30 is schematically shown in FIG. 31. The magnetically alignable flakes are aligned so as to form an aligned pattern wherein a portion of the magnetically alignable flakes are parallel to the substrate along a continuous imaginary line on a surface of the substrate between first and second points thereof, and the magnetically alignable flakes form curved patterns in a plurality of cross-sections normal the continuous imaginary line, and wherein the continuous imaginary line is a zigzag or wavy line between the first and second points.

The resulting image may be thought of as a zigzag or wavy rolling bar. When light is incident upon the magnetically alignable flakes from a light source, light reflected from the article forms a bright zigzag or wave which appears to move when the substrate is tilted with respect to the light source. The bright zigzag may include at least three sections. The flakes may be aligned so that in most, or at least in one of the plurality cross-sections, angles that the magnetically aligned flakes form with the substrate increase from zero at the imaginary line to 80 degrees on both sides of the imaginary line. In order for the dynamic zigzag or curve optical effect to be visible to a naked human eye, the aligned pattern of the pigment flakes should have a sufficient size. For example, the width of the curved pattern in the cross-sections between the two points with the 80 degrees tilt is preferably within the range of from 3 to 20 mm.

Figure 32:
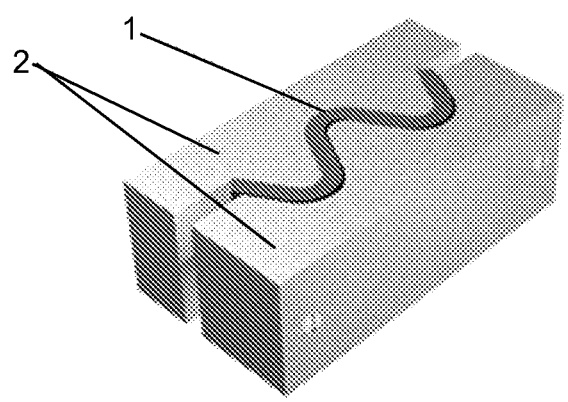
FIG. 32 is a schematic diagram of brackets used in a magnetic assembly.
Figure 33:
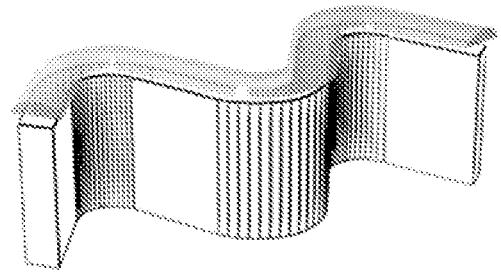
FIG. 33 is a schematic diagram of a magnetic field.
Figure 33A:
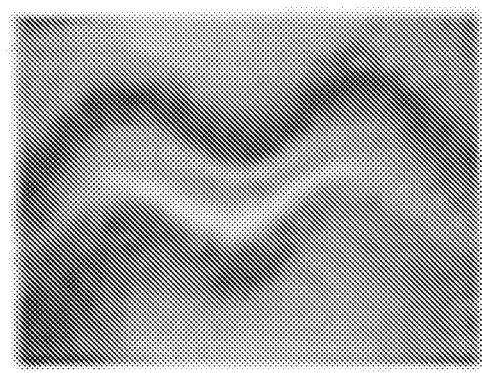
FIG. 33A is a photographs of a printed article.

With reference to FIG. 32, a method of forming a printed article includes using a stack 1 of flexible magnets bended between brackets 2 so as to form a zigzag or wave. The magnets may be Plastalloy™ (rubber bonded strontium ferrite) or Reance™ F and Reance™ SF flexible neodymium magnets from Electrodyne Company, Inc. The field profile of the wavy rolling bar is schematically shown in FIG. 33 and a photograph—in FIG. 33A.

A stack of thin flexible magnets allows making the rolling bar effect with many odd shapes of the same rolling bar radius. Furthermore, using flexible magnets in a variety of sizes, clamped and bended between brackets may result in a curved rolling bar wherein a radius of flake alignment changes along the curve defining the rolling bar.

The following comments and particular details relate to all the embodiments described herein.

The substrate may be a paper, plastic, or cardboard substrate, etc., and the resulting article may be a banknote, a credit card, or any other object thereto magnetically alignable flakes are applied as described herein.

In the embodiments where a magnetic ink is printed onto a plastic substrate (e.g. transparent polyester), the substrate may have a transparent hologram, bearing a symbol or a pattern, which may graphically match the pattern of the substrate. The hologram is preferably coated with a material with high index of refraction. Including a hologram provides an additional security feature to the device, because manufacturing of the device involves not only skills in security printing and magnetic alignment, but also skills in making of holograms.

The aforedescribed articles may be used as optical security devices, and may have two components: graphical and optical with optical component, possibly on the top of the graphical component, and be integrated into a banknote or a security label. The graphical component can include one of security patterns used in the document security industry and/or a picture or a symbol. The optical component can be made with color-shifting interference pigments or reflective metallic pigment flakes. The optical component enhances appearance of the graphical component. The optical component reflects light from a concave, convex, convexo-convex, or convexo-concave, etc. arrangement of magnetic pigments (flakes) dispersed in a binder and aligned along the lines of applied magnetic field. The binder is a light transmissive, preferably clear, UV-curable binder. The concentration of the particles in the binder is preferably in the range of 4 wt %-14 wt % so that the most of the coating containing magnetically alignable flakes is transparent and the underlying graphic component is visible. The low concentration coating provides a bright image, e.g. the boomerang or zigzag, only in the regions where the flakes are aligned in a curved pattern and may focus reflected light in a predetermined direction. The low concentration (4 wt %-14 wt %) of the flakes is useful to eliminate or at least minimize shadows of the bright boomerang, zigzag, or wavy image.

Both components may be printed using conventional techniques. Graphics and the optical effect produced by the optical component should complement each other. The optical component may be provided either on the top of the graphics or underneath of it. The optical component can be coated in patterns or can be coated as a continuous layer. The optical component can be in the form of a convex reflector (when the substrate printed with wet magnetic ink is placed on the top of the magnet) or concave reflector (when a thin transparent polymer sheet printed with wet magnetic ink is placed on the top of the magnet, flakes aligned in the field, ink cured and transparent sheet laminated with printed side to the graphical image) or a combination of concave and convex reflectors.

The graphical and optical components can be printed with pigments of the same color. Preferably, the optical effect generated by the optical component obscures only a small portion of entire region leaving the rest of the printed image available for observation.

Magnetically alignable pigment flakes may be formed of one or more thin film layers, including a layer of magnetic or magnetizable material such as Nickel, Cobalt, and their alloys so as to enable magnetic alignment of the flakes while in a liquid binder under the influence of a magnetic field. Such flakes are referred to sometimes as magnetic flakes which is understood to include magnetizable pigment flakes. The magnetic layer may be hidden between two reflector layers, preferably made of Aluminum. Additionally, a dielectric layer may be provided on each reflector layer, and an absorber layer—on each dielectric layer, thus forming color-shifting flakes. By way of example, the pigment flakes have the reflector/magnetic/reflector structure, or the absorber/dielectric/reflector/magnetic/reflector/dielectric/absorber structure, wherein the absorber layers are preferably Cr layers, the dielectric layers are preferably $MgF_2$ layers, and the reflector layers are preferably Al layers; of course, other materials may be used as known in the art. Various thin-film flakes and methods of their manufacturing are disclosed e.g. in U.S. Pat. Nos. 5,571,624, 4,838,648, 7,258,915, 6,838,166, 6,586,098, 6,815,065, 6,376,018, 7,550,197, 4,705,356 incorporated herein by reference. The magnetically alignable flakes are essentially planar, however may include symbols or gratings. The flakes have a thickness of between 50 nm and 2,000 nm, and a length of between 2 microns and 200 microns. The flakes may have an irregular shape. Alternatively, shaped flakes such as square, hexagonal, or other selectively-shaped flakes may be used to promote coverage and enhanced optical performance.

Preferably, the magnetically alignable flakes are highly reflective flakes having at least 50%, and preferably 70%, reflectivity in the visible spectrum.

The pigment flakes are conventionally manufactured using a layered thin film structure formed on a flexible web, also referred to as a deposition substrate. The various layers are deposited on the web by methods well known in the art of forming thin coating structures, such as Physical and Chemical vapor deposition and the like. The thin film structure is then removed from the web material and broken into thin film flakes, which can be added to a polymeric medium such as various pigment vehicles (binders) for use as ink, paint, or lacquer which are collectively referred herein as "ink," and may be provided to a surface of a substrate by any conventional process referred herein as "printing." The binder is preferably a clear binder, but may be tinted with a low amount or conventional dye, and may include a low amount of admixtures, e.g. taggant non-magnetic flakes having a symbol thereon.

Within the ink or paint, the magnetically alignable flakes may be oriented with application of a magnetic field produced by one or more permanent magnets or electromagnets. Advantageously, the magnetic alignment of the flakes as described in this application may be performed as part of a high-speed printing process, wherein a substrate with a printed or painted image moves at a speed of from 20 ft/min to 300 ft/min on a support, e.g. a belt or a plate, in proximity of a magnetic assembly, one described above. The magnetic assembly may be placed under the support, or embedded into a roller used in a rotational printing apparatus. Generally, the flakes tend to align along the magnetic lines of the applied field while the ink is still wet. Preferably, the ink is solidified when the printed image is still in the magnetic field. Various methods of aligning magnetically alignable flakes are disclosed e.g. in U.S. Pat. No. 7,047,883 and U.S. Patent Application No. 20060198998, now U.S. Pat. No. 8,343,615 both incorporated herein by reference.

In general, in the concave and convex patterns of reflective flakes, a cross-section of the pattern includes flakes aligned parallel to the substrate in the central part of the pattern, and tilted flakes with the angle between the flakes and the substrate gradually increasing in the direction from the center to the outer edge of the pattern. Preferably, flakes at the outer edges of the pattern are oriented almost normally, at least at 80 degrees, and preferably at 85 degrees to the substrate, so as to reduce shadows of the dynamic image by minimizing the disadvantageous "shallowing" effect. For clarity, an angle between a flake and a substrate is understood as an angle between a first plane parallel to the flake and a second plane parallel to the substrate.

Advantageously, a bright boomerang which gradually flips from one side to another side of an image, a bright rolling zigzag or wave may be used as security features as well as decorative elements.

The incorporation of sheet metal between the top of the magnet and the bottom of printed substrate with the layer of wet ink containing magnetic flakes allows tuning of the field direction and its magnetic flux magnitude. Magnetic fields can be re-routed around objects. By surrounding an object with a material which can "conduct" magnetic flux better than the materials around it, the magnetic field will tend to flow along this material and avoid the objects inside.

When ferromagnetic sheet or plate is placed into a magnetic field, it draws the field into itself providing a path for the magnetic field lines through it. The field on the other side of the plate is almost nil because the plate has diverted the field causing a lot of it to flow within the plate itself instead of in the air.

Magnetic properties of metals define how these metals divert magnetic field when they in the sheet form are placed in the field. Metals or alloys with high magnetic permeability are usually used got this purpose. Mu-metal or permalloy are broadly used for shielding purposes; they typically have relative permeability values of 80,000-100,000 compared to several thousand for ordinary steel.

Mu-metal and permalloy also have very low saturation, the state where an increase in magnetizing force produces no further increase in magnetic induction in a magnetic material. So while it is extremely good as a conduit for very weak fields, it is essentially not much better than air when it comes to very strong magnetic fields. The field is diverted toward the magnetic pole located in the center of their print with magnetic ink reducing radius of magnetically aligned ring that looked as if the field was focused. However, the reality is that such shielding of the field almost twice reduces its flux magnitude.

Figure 34:
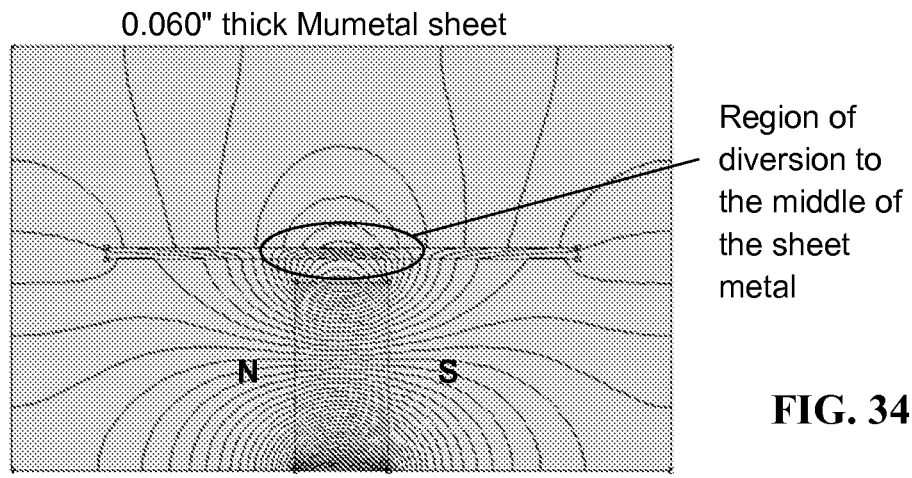
FIG. 34 is a schematic diagram of a magnetic field.
Figure 35:
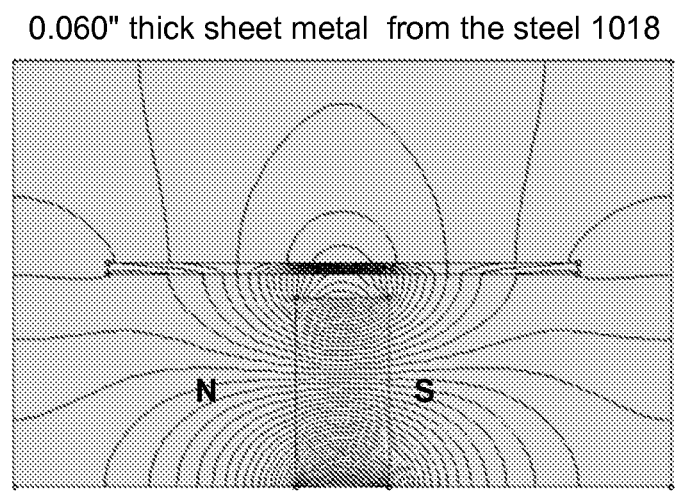
FIG. 35 is a schematic diagram of a magnetic field.

FIGS. 34 and 35 are simulations which illustrate changes in a magnetic field when a sheet of a different materials is placed above a magnet. A Mumetal sheet was placed on top of the magnet in FIG. 34 and a cold rolled sheet of 1018 steel was placed on the top of the same magnet.

As demonstrated in the pictures, the Mumetal sheet dissipates the field along its volume. The steel sheet, having a lower permeability, attracts a lot of field near the magnet.

The distance between the magnet and the sheet has also effect the field propagation through the metal and the field magnitude above the shield. A good demonstration of it can be seen in cartoons at http://www.coolmagnetman.com/motion10.htm.

The purpose of the diverters was in the deflection of the field in a predetermined direction from its original to change alignment of particles in predictable way.

Two materials have been used as diverters in two different methods of alignment. They were Mumetal sheets and cold rolled steel sheets (cold rolling makes sheets with a larger grain size that improves magnetic permeability). The thickness of the sheets varied in the range from 0.004" to 0.1".

Figures 36, 37:
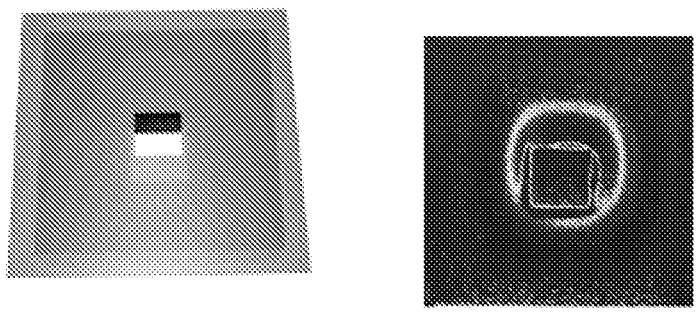
FIG. 36 is a schematic diagram of a magnetic assembly.
FIG. 37 is a photograph of a printed article.

Mumetal sheets, used in the first method, have been selected with the thickness that allowed the field penetrated up through the sheet. The diverters had a cut in the middle of it. The cuts had different shapes for different magnets. The field curved around the edges of the cut correspondingly aligning magnetic pigment in addition to the flakes aligned in the field penetrated through the magnets as illustrated in FIG. 25. Optical effects, produced by introduction of a diverter are illustrated in FIGS. 26-28. A magnet with a diverter is shown in FIG. 36 and the optical effect generated by this assembly is illustrated in FIG. 37.

For more unusual optical effects, the diverters were cut in different pieces and put on the top of the magnet to drive the field around the edges allowing it also penetrate through the plane of the diverter. Examples of such effects with corresponding magnets are demonstrated in FIGS. 38-46.

Figure 39:
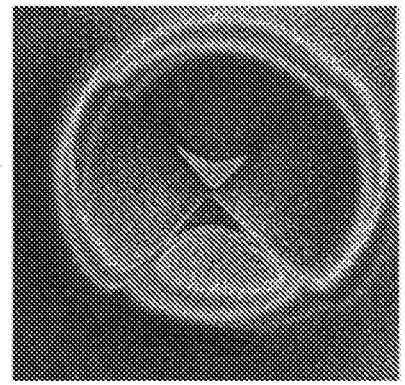
FIGS. 39 and 40 are photographs of a printed article.
Figure 40:
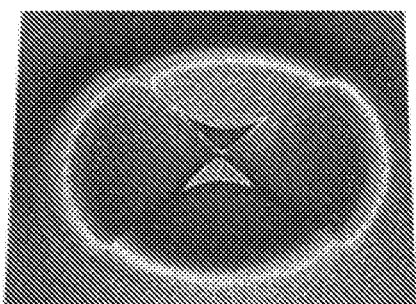

The optical effect in FIG. 39 is at normal angle while in FIG. 40 at the tilt away from the camera.

Figure 41:
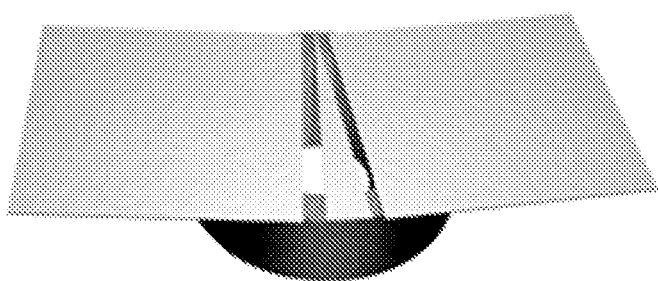
FIG. 41 is a schematic diagram of a magnetic assembly.
Figure 42:
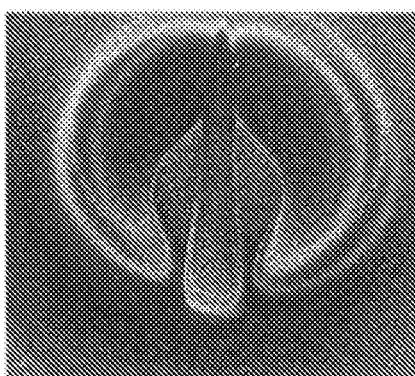
FIGS. 42 and 43 are photographs of a printed article.
Figure 43:
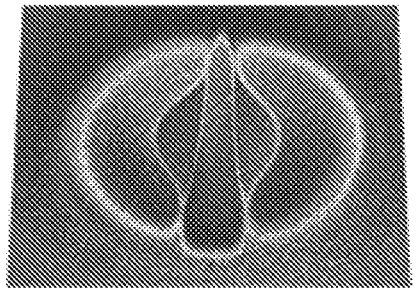

Magnetic assembly schematically illustrated in FIG. 41 produces effects shown in photographs at normal angle (FIG. 42) and at the tilt of the sample (FIG. 43).

Figure 44:
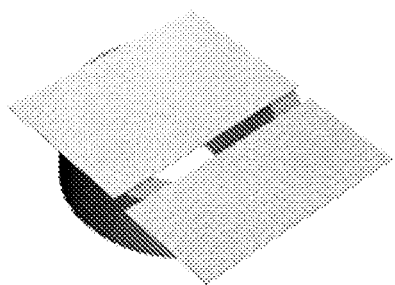
FIG. 44 is a schematic diagram of a magnetic assembly.
Figure 45:
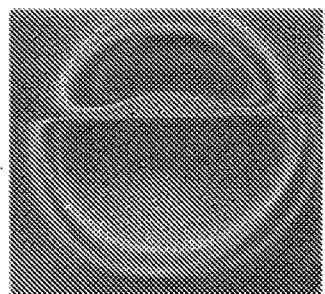
FIGS. 45 and 46 are photographs of a printed article.
Figure 46:
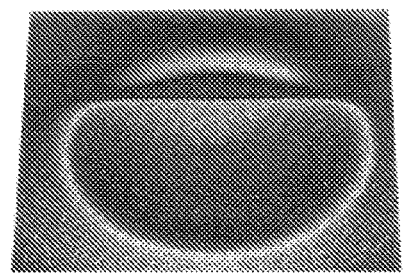

The magnetic assembly in FIG. 44 produces effects demonstrated in photographs at normal angle (FIG. 45) and at the tilt of the sample (FIG. 46).

The second method included steel diverters completely blocking magnetic field.

These diverters, also cut in pieced and put in particular places on the top of the magnet, blocked the field in these places and allowed the field to emerge from non-blocked places.

Figure 38:
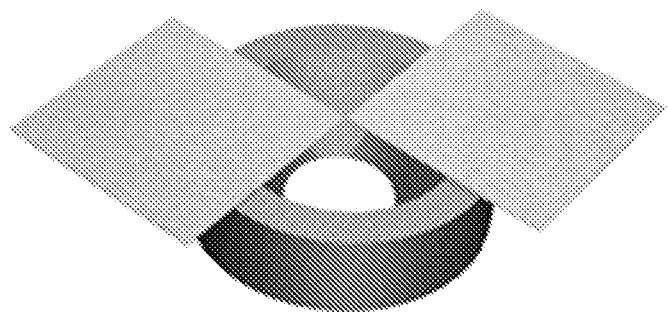
FIG. 38 is a schematic diagram of a magnetic assembly.
Figure 47:
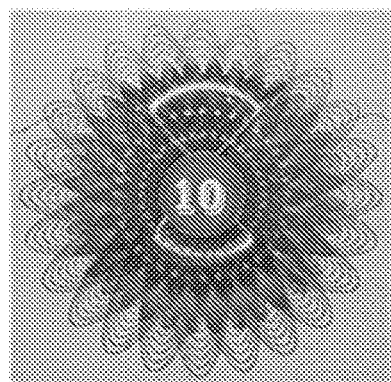
FIGS. 47 through 50 are photographs of a printed article.
Figure 48:
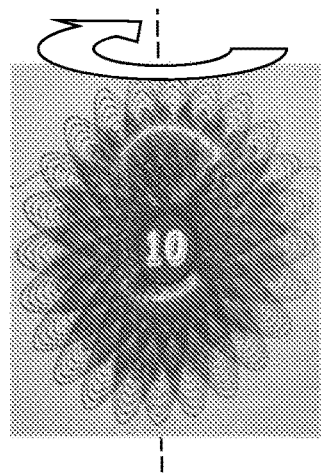
Figure 49:
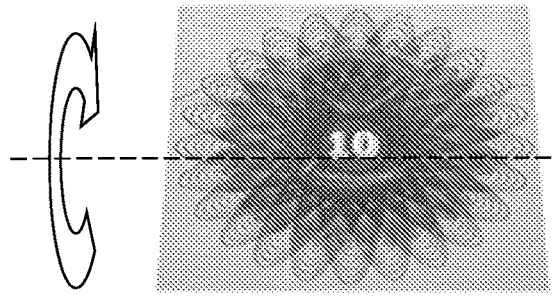
Figure 50:
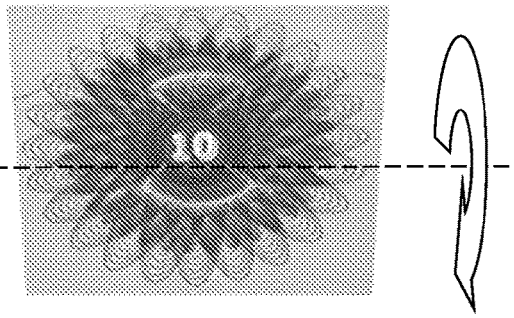

The same assembly as shown in FIG. 38 but with a different diverter produces a "bow tie" effect demonstrated in FIG. 47 at the normal angle, in FIG. 48 at a tilt to the left, in FIG. 49 at a tilt away from the camera, and in FIG. 50 at a tilt toward the camera. FIGS. 47-50 exhibit morphing effect. Morphing is a special effect in motion pictures and animations that changes (or morphs) one image into another through a seamless transition. The best demonstrated of the morphing among all four pictures in FIG. 49: upper part of the "bow" expands while the bottom part shrinks with the tilt of the sample away from the camera.

The thickness and material selection for a diverter depend on the strength of the magnet and its configuration. For example, neodymium boron iron sintered magnets are very strong. Placing thick steel plate on the top of the magnet in FIG. 38 doesn't prevent the field from coming through the diverter in order to align the flakes and form the pattern demonstrated in FIGS. 39 and 40. Replacement of the sintered magnet with a compression bonded neodymium boron iron magnet entirely converts the field through the volume of the diverter elimination its appearance on the surface of the diverter as shown in FIGS. 38 and 47-50. The field comes up through the openings between diverters and curves around the edges of the diverters creating a volume effect.

We claim:

1. A magnetic assembly, comprising:
    a magnet having at least one planar surface parallel to a magnetic axis of the magnet, wherein the magnet generates a magnetic field; and
    at least two steel sheet diverters, wherein each steel sheet diverter is placed on a portion of the at least one planar surface, and wherein the at least two steel sheet diverters are separated one from another by an opening; and
    wherein the magnetic field curves around an edge of the at least two steel sheet diverters.

2. The magnetic assembly of claim 1, wherein the magnet is circular shaped.

3. The magnetic assembly of claim 1, wherein the at least two steel sheet diverters are each placed on a top planar surface of the magnet.

4. The magnetic assembly of claim 1, wherein the at least two steel sheet diverters are three steel sheet diverters.

5. The magnetic assembly of claim 1, wherein the at least two steel sheet diverters each have a different size.

6. The magnetic assembly of claim 1, wherein the at least two steel sheet diverters each have a different shape.

7. The magnetic assembly of claim 1, wherein the magnet is a compression bonded neodymium boron iron magnet.

8. The magnetic assembly of claim 1, wherein the magnetic field penetrates through a plane of the at least two steel sheet diverters.

9. A method of forming an article, comprising:
    providing the magnetic assembly of claim 1;
    placing a substrate coated with a magnetic pigment onto the at least two steel sheet diverters; and
    aligning the magnetic pigment in the magnetic field to form an article.

10. The method of claim 9, further comprising viewing the article at a normal angle to yield a normal image; tilting the article around a first axis to yield a first image; tilting the article around a second axis to yield a second image; and tilting the article around the second axis in an opposite direction to yield a third image, wherein the article morphs into the first image, the second image, and the third image with a seamless transition.

11. The method of claim 9, wherein the magnetic field bows around an edge of each of the at least two steel sheet diverters to form an image.

12. The method of claim 11, wherein the image includes at least two curved bright lines.

13. The method of claim 12, wherein an intensity of the at least two curved bright lines changes when viewed at a normal angle and at a tilt angle.

* * * * *